US009002929B2

(12) United States Patent
Ingram

(10) Patent No.: US 9,002,929 B2
(45) Date of Patent: Apr. 7, 2015

(54) METHODS AND APPARATUS TO REDUCE MEMORY REQUIREMENTS FOR PROCESS CONTROL SYSTEM SOFTWARE APPLICATIONS

(75) Inventor: David Curtis Ingram, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 301 days.

(21) Appl. No.: 13/410,607

(22) Filed: Mar. 2, 2012

(65) Prior Publication Data

US 2013/0232186 A1 Sep. 5, 2013

(51) Int. Cl.
*G06F 15/16* (2006.01)
*G06F 3/00* (2006.01)
*G06F 9/44* (2006.01)
*G06F 3/048* (2013.01)

(52) U.S. Cl.
CPC .............. *G06F 9/4445* (2013.01); *G06F 3/048* (2013.01)

(58) Field of Classification Search
CPC ........... G05B 2219/31342; G05B 2219/31132; G05B 2219/31121; G05B 19/418
USPC .............. 710/16, 19; 715/769, 771, 705, 739, 715/764, 765; 717/168; 345/3.1; 709/203, 709/219, 229; 719/329
See application file for complete search history.

(56) References Cited

U.S. PATENT DOCUMENTS

| 7,620,901 B2 * | 11/2009 | Carpenter et al. ............. 715/754 |
| 2004/0194078 A1 * | 9/2004 | Shen ............................. 717/168 |
| 2007/0075916 A1 * | 4/2007 | Bump et al. .................... 345/3.1 |
| 2007/0079250 A1 * | 4/2007 | Bump et al. .................... 715/762 |
| 2009/0049207 A1 * | 2/2009 | Reynolds et al. ............... 710/16 |
| 2009/0292995 A1 * | 11/2009 | Anne et al. ..................... 715/736 |

(Continued)

FOREIGN PATENT DOCUMENTS

| DE | 102007035158 | 1/2009 |
| EP | 1137972 | 10/2001 |
| WO | 2005101149 | 10/2005 |

OTHER PUBLICATIONS

PCT, "International Search Report," issued in connection with PCT Application No. PCT/US2013/028563, dated Jun. 17, 2013 (3 pages).

(Continued)

*Primary Examiner* — Wing F Chan
*Assistant Examiner* — Raji Krishnan
(74) *Attorney, Agent, or Firm* — Hanley, Flight and Zimmerman, LLC

(57) ABSTRACT

Methods and apparatus to reduce memory requirements of software applications in a process control system are disclosed. An example apparatus includes a primary process space to execute a primary application for use in a process control system, a primary user interface associated with the primary application and to be rendered on a display, and a secondary application to be invoked via the primary application. The secondary application includes a client application to enable interaction between the primary application and the secondary application, and a server application that serves the client application to implement at least one software component to generate a secondary user interface associated with the secondary application. The secondary user interface is to be communicated to the primary application to be rendered within the primary user interface.

18 Claims, 9 Drawing Sheets

(56) References Cited

U.S. PATENT DOCUMENTS

| | | | |
|---|---|---|---|
| 2010/0057947 A1* | 3/2010 | Nakagawa | 710/19 |
| 2011/0153658 A1* | 6/2011 | Laird-McConnell | 707/769 |
| 2012/0271962 A1* | 10/2012 | Ivanov et al. | 709/231 |
| 2013/0232186 A1* | 9/2013 | Ingram | 709/203 |

OTHER PUBLICATIONS

PCT, "Written Opinion," issued in connection with PCT Application No. PCT/US2013/028563, dated Jun. 17, 2013 (10 pages).

* cited by examiner

METHODS AND APPARATUS TO REDUCE MEMORY REQUIREMENTS FOR PROCESS CONTROL SYSTEM SOFTWARE APPLICATIONS

FIELD OF THE DISCLOSURE

This disclosure relates generally to computer software architecture, and, more particularly, to methods and apparatus to reduce memory requirement for process control system software applications.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other hardware devices, such as operator workstations, personal computers, data historians, report generators, centralized databases, etc. Such devices typically run a 'top level' process control system software application that enables operators and/or engineers to perform any of a variety of functions with respect to the processes of a process control system and interact with the various controllers, field devices, and other components within the process control system. In addition to control system software applications to control the operation of a process control system, operators and/or engineers may also use asset management software applications and/or other software applications to set up, configure, maintain, and/or test the reliability of components and devices within the process control system whether or not the associated process is actually in operation. These various 'top level' software applications are collectively referred to herein as process management software applications.

In addition to the 'top level' process management software applications, many of the individual controllers, field devices and/or other process control system components have associated software applications that interact with the process management software applications. However, the controllers, field devices, and/or other components in a process control system may be produced by any number of different manufacturers. Accordingly, each manufacturer may provide different hardware devices, each with corresponding software that is different from the hardware and software of other manufacturers. Further, the developers of the process management software applications may be associated with another entity. As a result, many manufacturers and software developers in the process control system industry create hardware and software that comport with standardized application interfacing frameworks to enable interaction between the different software applications and process hardware within a process control system.

A typical application interfacing framework used within the process control system industry is based on object linking and embedding (OLE), component object model (COM), and distributed component object model (DCOM) technologies developed by Microsoft®, as well as later generations of the technology including COM+ and .NET. At a general level, these application interfacing frameworks provide a common structure to interface components/objects of Windows-based software applications.

A particular implementation of these component based interfacing frameworks within the process management industry is known as field device tool (FDT) technology. FDT technology defines standards for the communication and configuration interface between all field devices and their host(s) within a process control system setting. FDT technology involves two main components: (1) an FDT Frame application and (2) a Device Type Manager (DTM). An FDT Frame application is a host application, such as a 'top level' process management software application, that may communicate and/or interact with any of the DTMs within a process control system based on the standardized interfacing framework of FDT technology.

A DTM is a software package associated with a particular field device or other process control system equipment containing all the device-specific data, functions and management rules, as well as user interface elements for an operator and/or engineer to configure, operate, and/or maintain the device via the FDT Frame application. Furthermore, some DTMs known as CommDTMs are developed specifically for communication equipment (e.g., gateways, multiplexers, etc.) to enable the conversion of data from one protocol to another (e.g., Ethernet, HART, PROFIBUS, etc.). Accordingly, FDT technology enables the seamless integration of devices from any manufacturer that complies with the FDT framework over one or multiple fieldbus protocols via a single user interface (i.e., the FDT Frame application). Another implementation of the component based interfacing frameworks described above is known as field device interface or field device integration (FDI) that builds upon FDT technology. In particular, FDI technology takes FDT technology and incorporates standards known in the process industry regarding device description (DD) technology to further enable the interfacing and communication of field devices within a process control system setting.

SUMMARY

Figure 1:
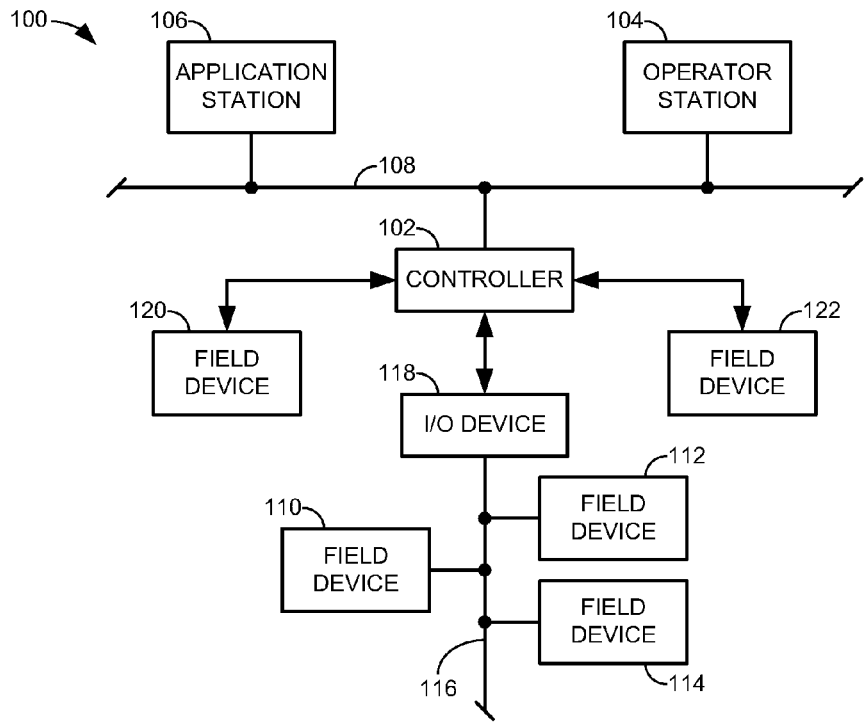
FIG. 1 is a schematic illustration of an example process control system within which the teachings of this disclosure may be implemented.

Methods and apparatus to reduce memory requirements of software applications in a process control system are disclosed. In one example, an apparatus includes a primary process space to execute a primary application, a primary user interface associated with the primary application and to be rendered on a display for use in a process control system, and a secondary application to be invoked via the primary application. The secondary application includes a client application to enable interaction between the primary application and the secondary application, and a server application that serves the client application to implement at least one software component to generate a secondary user interface associated with the secondary application, and where the secondary user interface is to be communicated to the primary application to be rendered within the primary user interface.

In another example, a method involves receiving a request via a primary user interface associated with a primary application associated with a process control system to execute at least one component of a secondary application associated with a device in the process control system, where the secondary application includes a client application and a server application, and where the at least one component is implemented by the server application, instantiating a first instance of the client application to enable interaction with the primary application, instantiating the server application to serve the client application, generating a secondary user interface associated with the first instance of the client application based on the at least one component implemented by the server application, and communicating the secondary user interface to the primary application for rendering in the primary user interface.

DETAILED DESCRIPTION

Many process control systems contain numerous different devices and other equipment that may be produced by a variety of different manufacturers. Furthermore, each manufacturer generally develops its own proprietary software applications that are associated with each device. However, the industry has developed standardizing non-proprietary application interfacing frameworks (e.g., FDT technology) that can be incorporated into each of the device-specific software applications (e.g., DTMs) to enable a 'top level' process management software application (e.g., an FDT Frame application), that also complies with the standardized framework, to recognize and interact with the device-specific software associated with each of the various devices. While the following description details examples based primarily upon FDT technology, the teachings of this disclosure may be adapted to any other suitable component based interfacing framework, such as, for example, FDI technology mentioned above.

Typically, when operators and/or engineers want to diagnose, configure, calibrate, or otherwise interact with a device within a process control system, they invoke the device-specific software of the device of interest via the process management software application. Once invoked, the device-specific software may perform the selected task and then provide a corresponding output to the process management software application for display based on the standardized framework that interfaces the process management software application and the device-specific software. Thus, although the display may be integrated into a single user interface associated with the primary application, the core business logic including the functional software components and/or the user interface software components associated with the device are contained and executed by the corresponding device-specific software. In some circumstances, operators and/or engineers may desire to perform configurations, diagnostics, calibrations, etc., on more than one device at a time. Accordingly, each time they select a new device to focus on, the process management software application may invoke the corresponding device-specific software. Furthermore, when operators and/or engineers desire to focus on a number of the same or similar devices located at different locations throughout a process control system, the process management software application will invoke a separate instance of the associated device-specific software, even if each of the selected devices has the same software associated with it. For example, a process control system may have many valves produced by a common manufacturer and, therefore, each of the valves may be associated with the same proprietary software containing the same business logic to perform the configurations, calibrations, diagnostics, or other tasks associated with each of the valves. As a result, if operators and/or engineers desire to work with more than one of these valves, the same core functional components and/or user interface components of the device-specific software shared by each of the selected valves may be instantiated multiple times. This redundant instantiation of common software components may increase computer memory requirements and/or reduce performance of the process management and related software applications.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator and/or engineer to review and/or operate one or more operator display screens and/or applications that enable the operator and/or engineer to view process control system variables, states, conditions, alarms; change process control system settings (e.g., set points, operating states, clear alarms, silence alarms, etc.); configure and/or calibrate devices within the process control system 100; perform diagnostics of devices within the process control system 100; and/or otherwise interact with devices within the process control system 100. An example manner of implementing the example operator station 104 of FIG. 1 is described below in connection with FIG. 2.

The example operator station 104 includes and/or implements a primary application (e.g., the example primary application of FIG. 2) to serve as a process management software application. The primary application is associated with a primary user interface (e.g., the example primary user interface of FIG. 4) to display information and/or provide visual indications of the state of the process control system and its component parts. While operators and/or engineers may achieve a high-level overview of a process control system via the primary user interface of the primary application, they may also desire more detailed information and/or control of particular devices within the process control system. Accordingly, the example operator station 104 also includes and/or implements one or more secondary applications (e.g., the example secondary application(s) of FIG. 2) associated with specific devices that contain the core business logic and functional components to perform device-specific tasks including maintenance, calibration, reliability testing, configuration, diagnostics, communications, data collection and storage, e-mail, printing, etc. Furthermore, the example secondary applications also include the core user interface components to generate content for a secondary user interface corresponding to the aforementioned tasks associated with the specific device. In some examples, operators and/or engineers may invoke the secondary applications via the primary application, which serves as a 'top level' host application to interface and/or communicate with the secondary applications of the many devices within the process control system. Furthermore, in some examples, the interfacing framework between the primary and secondary applications enables some or all of the output display generated by the secondary applications to be rendered within the primary user interface. Thus, while the core functional and user interface software components of a specific device are executed by a corresponding secondary application, the resulting content of the secondary user interface (or portions thereof) may be embedded within the primary user interface to enable review and/or interaction by an operator and/or engineer via the primary user interface.

The example workstation 106 of FIG. 1 may be configured as an application station to perform one or more information technology applications, user-interactive applications and/or communication applications. For example, the workstation 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, as will be readily appreciated by those having ordinary skill in the art, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112 and 114 via a data bus 116 and an input/output (I/O) gateway 118. The smart field devices 110, 112, and 114 may be Fieldbus compliant valves, actuators, sensors, etc., in which case the smart field devices 110, 112, and 114 communicate via the data bus 116 using the well-known Foundation Fieldbus protocol. Of course, other types of smart field devices and communication protocols could be used instead. For example, the smart field devices 110, 112, and 114 could instead be Profibus and/or HART compliant devices that communicate via the data bus 116 using the well-known Profibus and HART communication protocols. Additional I/O devices (similar and/or identical to the I/O gateway 118 may be coupled to the controller 102 to enable additional groups of smart field devices, which may be Foundation Fieldbus devices, HART devices, etc., to communicate with the controller 102.

In addition to the example smart field devices 110, 112, and 114, one or more non-smart field devices 120 and 122 may be communicatively coupled to the example controller 102. The example non-smart field devices 120 and 122 of FIG. 1 may be, for example, conventional 4-20 milliamp (mA) or 0-24 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to display an interface of a process management software application described in greater detail below may be advantageously employed, the methods and apparatus to control information presented to operators and/or engineers described herein may, if desired, be advantageously employed in other process plants and/or process control systems of greater or less complexity (e.g., having more than one controller, across more than one geographic location, etc.) than the illustrated example of FIG. 1.

Figure 2:
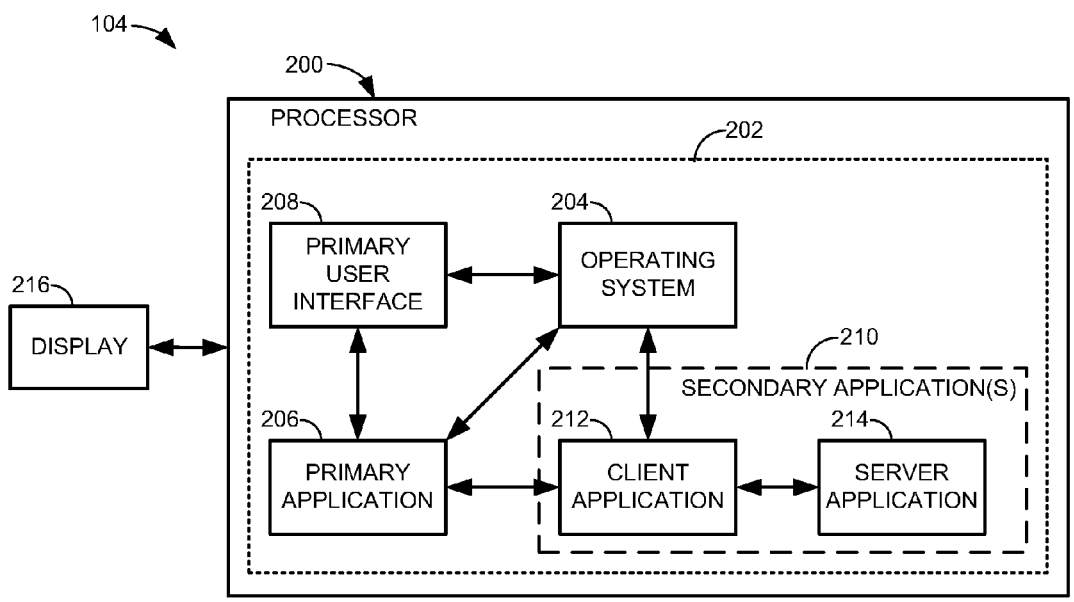
FIG. 2 illustrates an example manner of implementing the example operator station of FIG. 1.

FIG. 2 illustrates an example manner of implementing the example operator station 104 of FIG. 1. While the following description is provided with respect to the operator station 104, the example manner of implementing the example operator station 104 may also be used to implement the example workstation 106 of FIG. 1. The example operator station 104 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, a primary application 206, a primary user interface 208, and one or more secondary applications 210. While known software architectures may execute the secondary application(s) 210 as single unitary application(s), the secondary application(s) 210 in the disclosed examples may be executed via a client application portion 212 and a server application portion 214. An example operating system 204 is an operating system from Microsoft®. The example main memory 202 of FIG. 2 may be implemented by and/or within the processor 200 and/or may be one or more memories and/or memory devices operatively coupled to the processor 200.

To allow operators and/or engineers to interact with the example processor 200, the example operator station 104 of FIG. 2 includes any type of display 216. Example displays 216 include, but are not limited to, a computer monitor, a computer screen, a television, a mobile device (e.g., a smart phone, a Blackberry™ and/or an iPhone™), etc., capable of displaying user interfaces and/or applications implemented by the processor 200 and/or, more generally, the example operator station 104. The example operating system 204 of FIG. 2 displays and/or facilitates the display of the example primary user interface 208 of the example primary application 206 by and/or at the example display 216. Similarly, the example operating system 204 displays and/or facilitates the display of secondary user interface(s) associated with the example secondary application(s) 210. An example primary user interface 210 is described below in connection with FIGS. 3-5.

The example primary application 206 may be a 'top level' process management software application or any other human-machine interface (HMI) software application that enables an operator and/or engineer to have a high-level overview of a process control system (e.g., the process control system 100 of FIG. 1) and/or to control, configure, diagnose, or otherwise interact with and/or acquire data regarding the processes and components within the process control system 100. More specifically, the primary application 206 may invoke and/or communicate with the various devices and other components within the process control system 100 including any software associated with each process control system component, such as the secondary applications 210. Frequently, the desired information may be obtained, or the desired tasks performed, through the execution of the secondary application(s) 210 which, as described above, contain the core business logic, functional components, and/or user interface components associated with specific devices.

In many known process control systems, each secondary application 210 corresponding to a particular device is a unitary application. As such, when operators and/or engineers desire to communicate and/or interact with a particular device, an entire corresponding secondary application 210 is invoked and instantiated within the memory 202. Furthermore, in a typical processing plant, operators and/or engineers may desire to diagnose, calibrate, configure, etc., more than one device at a time. However, it is not uncommon for the devices of interest to be the same or similar devices located at different locations within the processing plant. For example, a processing plant may have hundreds of identical or similar valves located throughout the process space. Accordingly, each of these devices may be associated with a common secondary application 210. However, in many known process control systems, each time an operator or engineer invokes the secondary application 210 via the primary application 206 a new instance of the secondary application 210 is instantiated, even if the secondary application 210 has already been invoked for another device. As a result, the duplication of a secondary application 210 multiple times may result in unnecessary burdens on computer memory resources, thereby reducing efficiencies and increasing costs.

To alleviate the effects of the large memory footprint resulting from multiple instances of the same secondary application 210, the example secondary application 210 described herein comprises a client application portion 212 and a server application portion 214 that serves the client application 212. In particular, the server application 214 may contain and execute the majority, or any part thereof, of the secondary application 210 including any or all of the core functional components and/or the core user interface components of the secondary application 210. The client application 212, in turn, serves as a front end for the secondary application 210 to enable the interfacing relationship with the primary application 206 as described above. Accordingly, from the perspective of the primary application 206, the client and server applications 212 and 214 collectively function to behave like a unitary application. That is, as the server application 214 serves the client application 212 by executing the core software components of the secondary application 210, the client interfaces with the primary application 206 to provide a seamless connection between the primary application 206 and the server application 214. As a result, the secondary application 210 of the illustrated example can be incorporated into any process control system without having to alter the primary application 206 or anything other than what would have been done originally to implement many known secondary applications that are unitary in nature. The interface between the primary application 206 and the secondary application 210 (via the client application 212) and between the client application 212 and the server application 214 (within the secondary application 210) will be described more fully below in connection with FIGS. 4-5.

While an example manner of implementing the example operator station 104 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 204, the example primary application 206, the example primary user interface 208, the example secondary application(s) 210, the example client application 212, the example server application 214, and/or, more generally, the example operator station 104 of FIG. 2 may be implemented by hardware, software, firmware and/or any combination of hardware, software and/or firmware. Further still, the example operator station 104 may include additional elements, processes and/or devices instead of, or in addition to, those illustrated in FIG. 2, and/or may include more than one of any or all of the illustrated data structures, elements, processes and/or devices.

Figure 3:
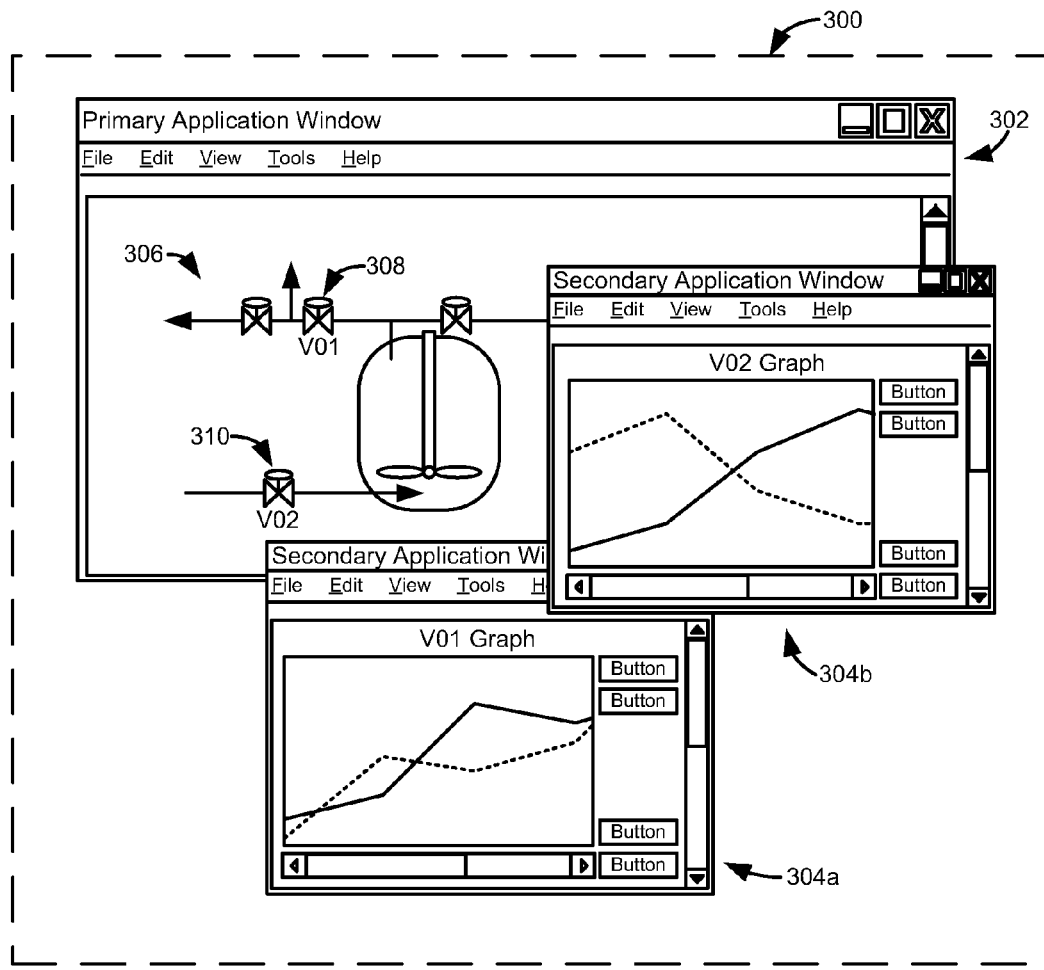
FIG. 3 illustrates a known display of a primary user interface associated with the example primary application of FIG. 2 and first and second secondary user interfaces associated with first and second instances of the secondary application of FIG. 2.

FIG. 3 illustrates a known display 300 of a primary user interface 302 associated with the example primary application 206 of FIG. 2 and first and second secondary user interfaces 304a-b associated with first and second instances of the secondary application 210. In some examples, the primary user interface 302 may include a piping and instrumentation diagram (P&ID), a process flow diagram (PFD), process control system device tree, or other process plant layout 306 displaying (e.g., using either text and/or graphics), some or all of the devices within a process control system (e.g., the process control system 100). As described above, operators and/or or engineers interested in detailed information regarding particular ones of the devices shown in the plant layout 306 may click on the devices to invoke the secondary application 212 (FIG. 2) associated with the devices. If multiple devices that share a common secondary application 212 are selected, each time an additional device is selected an additional instance of the secondary application 212 is instantiated.

For example, operators and/or engineers may desire to diagnose, calibrate, configure, and/or perform other tasks on a first valve 308 and a second valve 310 shown in the process plant layout 306 (both associated with the same secondary application 210) by plotting a graph and/or other data depicting characteristics of interest associated with each of the valves 308 and 310. To do so, an operator and/or engineer may click on the first valve 308 in the plant layout 306 in the primary user interface 302, thereby invoking a first instance of the secondary application 210 corresponding to the first valve 308. Once invoked, the first instance of the secondary application 210 generates the corresponding secondary user interface 304a with the desired content based on the diagnostics, calibration, configuration, and/or other tasks executed by the secondary application 210. The operator and/or engineer may then repeat the process for the second valve 310 such that a second instance of the secondary application 210 generates the second secondary user interface 304b containing output data corresponding to the second valve 310. Accordingly, although the displayed content of the first and second secondary user interfaces 304a-b is different, the very same tasks were performed in each case using duplicate instances of the very same computer code (i.e., two instances of the same secondary application 210). Furthermore, beyond the duplication of common functional components of the secondary application 210, the user interface components of the secondary application 210 are also duplicated to generate the separate first and second secondary user interfaces 304a-b. The redundancy created by invoking the same secondary application 212 multiple times to perform the same function unnecessarily increases the demand on computer memory resources, thereby potentially reducing the efficiency and/or increasing the costs of running the process control system 100 of FIG. 1.

Figure 4A:
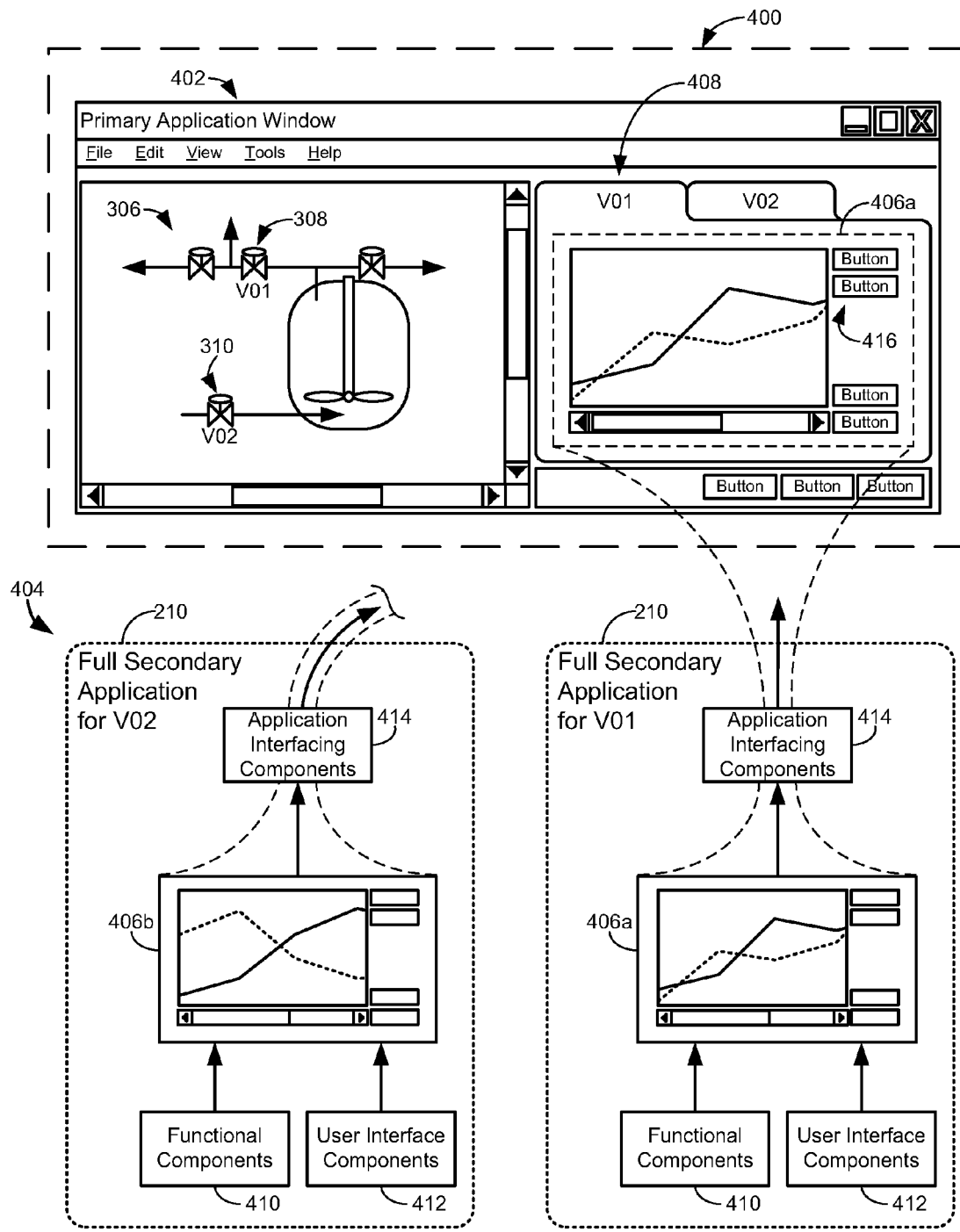
FIG. 4A illustrates another known display of a primary user interface along with a known software architecture rendering the first secondary user interface of FIG. 3 within a frame of the primary user interface.
Figure 4B:
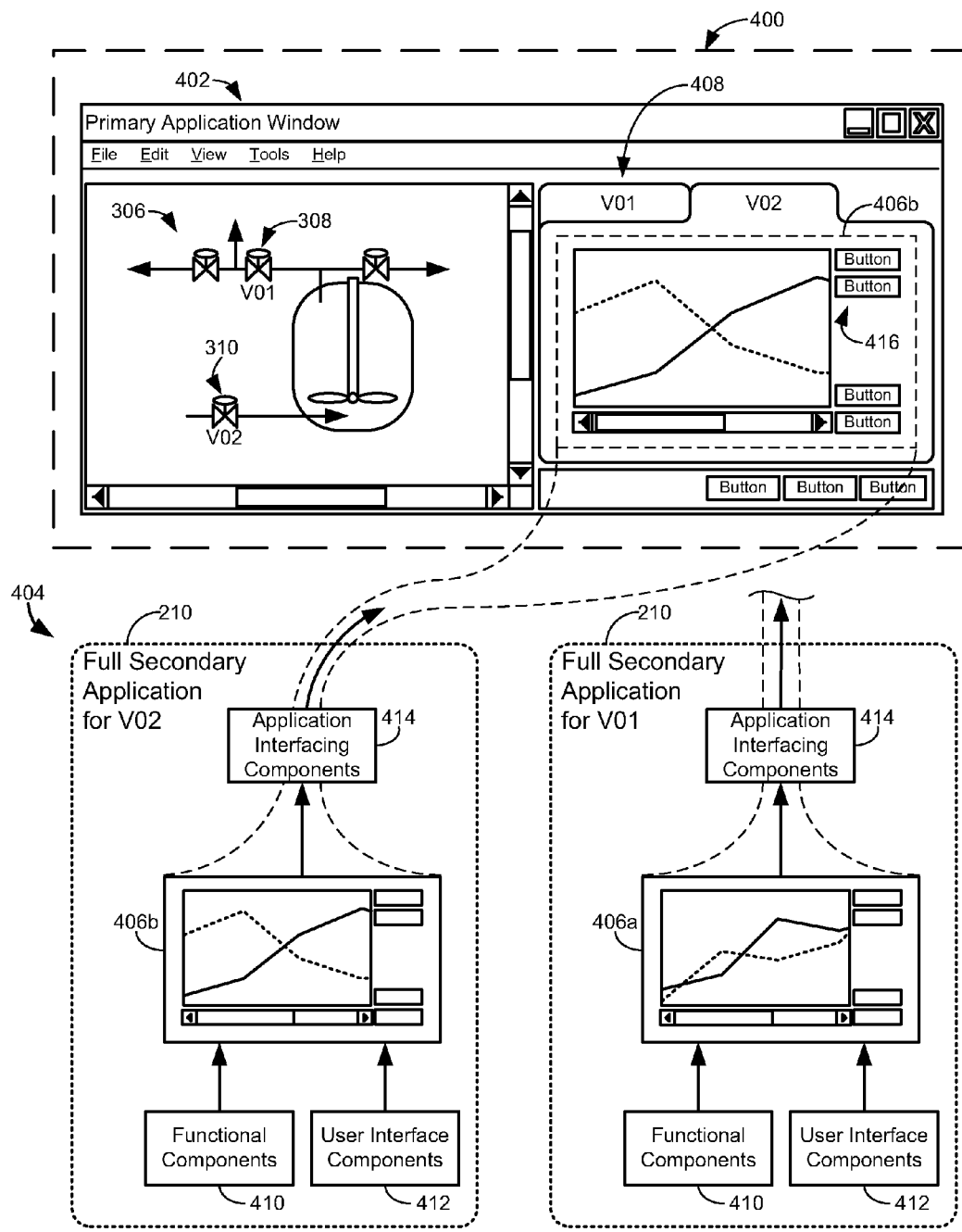
FIG. 4B illustrates the known display of FIG. 4A with the second secondary user interface of FIG. 3 being rendered within the frame of the primary user interface of FIG. 4.

Turning now to FIGS. 4A and 4B, therein is illustrated another known display 400 of a primary user interface 402 along with a known software architecture 404 to render first and second secondary user interfaces 406a-b within the primary user interface 402 corresponding to the first and second valves 308 and 310 of the plant layout 306. As described in connection with FIG. 3, each secondary user interface 406a-b is supported by a separate instance of the secondary application 210. In many typical FDT implementations, the FDT Frame application (i.e., the primary application 206) provides a window or frame 408 within which a single DTM (i.e., one of the secondary applications 210) may render content (i.e., the secondary user interface 406a). Accordingly, FIG. 4A illustrates the known display 400 with the first secondary user interface 406a being rendered within the frame 408 of the primary user interface 402, while FIG. 4B illustrates the known display 400 of FIG. 4A with the second secondary user interface 406b being rendered within the frame 408 of the primary user interface 402.

While not generally done in the industry, an FDT Frame application could be adapted to provide separate screen space for content from multiple DTMs simultaneously. For example, the primary user interface 402 could be enabled to render both secondary user interfaces 406a-b at the same time. As such, although only one of the secondary user interfaces 406a-b is displayed at a time, both instances of the secondary application 210 are still fully instantiated and interfacing with the primary application 206 at the same time. In particular, the primary application 206 (FIG. 2) and each instance of the secondary application 210 interact via an application interfacing framework described above to pass information between the applications, including the secondary user interfaces 406a-b generated by the corresponding instances of the secondary application 210 to be rendered within the frame 408 of the primary user interface 402. Each instance of the secondary application 210 shown in FIGS. 4A and 4B interfaces independently with the primary application 206. Accordingly, each instance of the secondary application 210 in FIG. 4 executes the same core functional components 410 and the same user interface components 412 to perform the requested tasks and generate the first and second secondary user interfaces 406a-b corresponding to each of the selected valves 308 and 310.

To enable the first and second secondary user interfaces 406a-b to be rendered within the primary user interface 402, each instance of the secondary application 210 in the known software architecture 404 may have application interfacing components 414 containing standardized code complying with an application interfacing framework (e.g., FDT technology) to establish an interface between each instance of the secondary application 210 and the primary application 206. By so doing, each instance of the secondary application 210 may receive requests from the primary application 206 and provide the corresponding output (e.g., the secondary user interfaces 406a-b) to be embedded within the primary user interface 402. Similarly, the primary application 206 may contain standardized code defined by the application interfacing framework to communicate the requests to the secondary application 210 and provide the frame 408 within the primary user interface 402 where the output of the secondary application 210 may be rendered. More particularly, part of the interfacing relationship that is established between the primary and secondary applications 206 and 210 includes a pointer, such as a handle or other smart pointer, provided by the primary application 206 that points to the location of the frame 408 such that the secondary application 210 can directly pass content to be rendered in the primary user interface 402 via the pointer. In addition to graphical content that may be displayed within the frame 408, the secondary user interfaces 406a-b may contain buttons 416 and/or other interactive elements to enable operators and/or engineers to interact with the content rendered within the frame 408 of the primary user interface 402.

Figure 5:
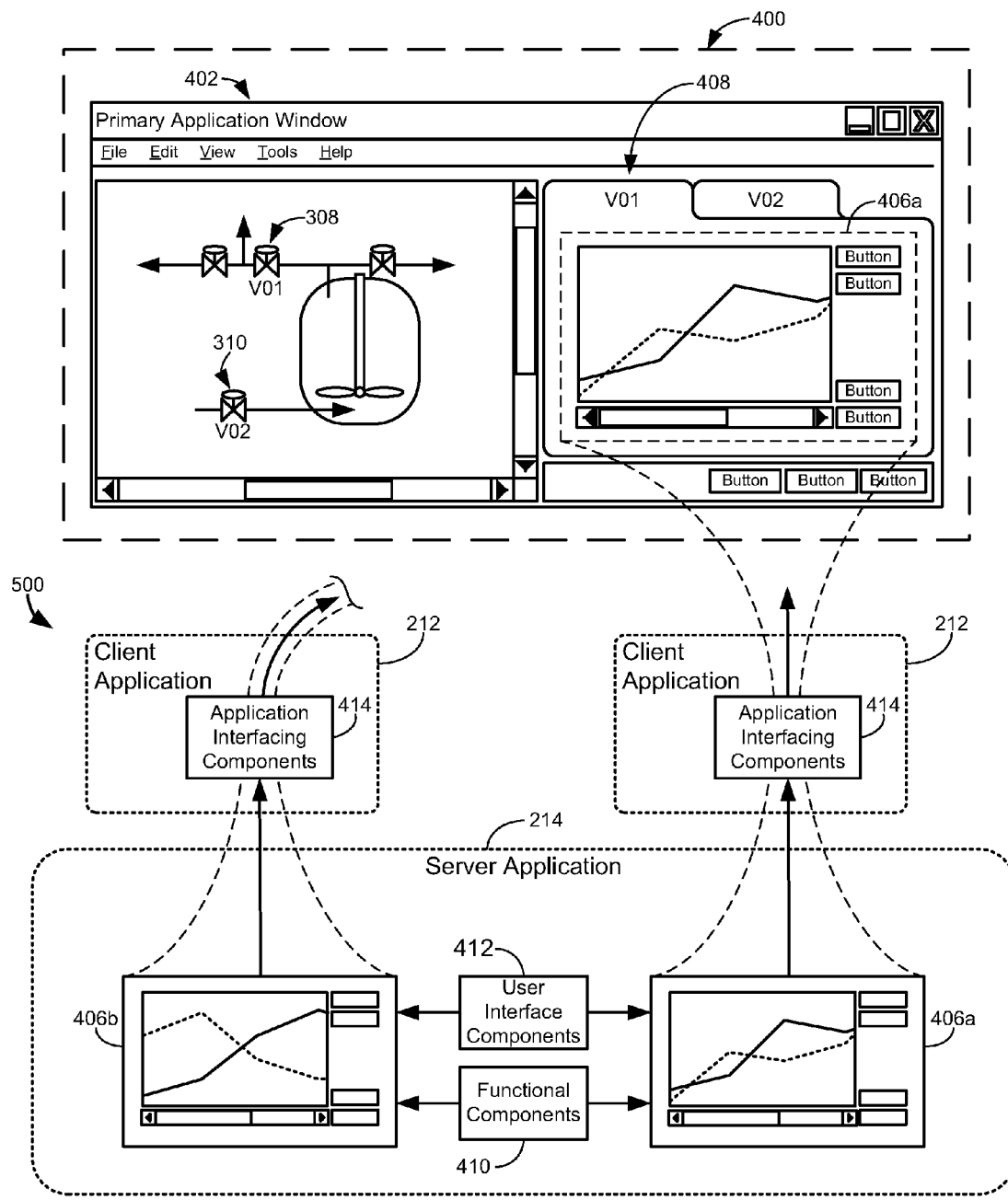
FIG. 5 illustrates an example software architecture implement to generate the display 400 of FIGS. 4A and 4B.

FIG. 5 illustrates an example software architecture 500 that may be used to generate the display 400 of FIGS. 4A and 4B. While the display 400 in FIG. 5 is the same as the display 400 in FIG. 4A where the first secondary user interface 406a is rendered within the frame 408 of the primary user interface 402, the underlying software architecture 500 is different.

Unlike the known software architecture 404 of FIGS. 4A and 4B where each instance of the secondary application 210 is a fully instantiated unitary application, the first and second instances of the secondary application 210 within the example software architecture 500 are separated into first and second instances of a client application portion 212 (corresponding to the first and second valves 308 and 310) and a single instance of a server application portion 214 that serves both instances of the client application 212. As illustrated, each instance of the client application 212 contains the application interfacing components 414 to interface with the primary application 206 (FIG. 2) in the same manner as the unitary secondary applications 210 of FIGS. 4A and 4B. In the illustrated example, the server application 214 may contain the functional components 410 and related business logic of the secondary application 210 to perform any task (e.g., calibration, configuration, diagnostics, etc.) associated with the first and second valves 308 and 310. Furthermore, the server application 214 may contain the user interface components 412 of the secondary application 210 to generate the content for the first and second secondary user interfaces 406a-b based upon, among other things, the results of any calculations or other tasks performed by the functional components 410. While the server application 214 is shown containing all the user interface components 412 and the functional components 410 of the secondary application 210, in other examples the components of the secondary application 210 may be divided between the server application 214 and the client application 212 in any suitable manner.

As stated previously, there are two instances of the client application 212 but only one instance of the server application 214. Thus, unlike the known software architecture 404 shown in FIG. 4 where the functional components 410 are instantiated multiple times in each separate instance of the secondary application 210, the functional components 410 in the example software architecture 500 of FIG. 5 are instantiated only once to serve both instances of the client application 212 and perform the configuration, calibration, diagnostics, and/or other tasks corresponding to the first and second valves 308 and 310. Similarly, while the known software architecture 404 shown in FIG. 4 instantiates the user interface components 412 multiple times in each instance of the secondary application 210, in the illustrated example of FIG. 5, the server application 214 instantiates only one instance of the user interface components 412 to serve both instances of the client application 212.

By placing the core functional components and/or the core user interface components within the single instance of the server application 214, the memory footprint of the client application 212 can be significantly reduced. For example, when operator and/or engineers desire to perform diagnostics, configurations, calibrations, etc., for particular devices, they may invoke the example secondary application 210 associated with the devices of interest via the primary application 206 as before. However, in the disclosed example, where the devices of interest have a common secondary application 210, only the client application portion 212 of the secondary application 210 is instantiated for each device while a single server application 214 is instantiated to serve both instances of the client application 212. Thus, although there are still two instances of the client application 212 (each containing the same application interfacing components 414), the functional and user interface components 410 and 412 contained within the server application 214 are instantiated only once, thereby avoiding the duplication of these components. Furthermore, the functional and user interface components 410 and 412 typically comprise the bulk of the secondary application 210. As a result, the overall memory footprint of the example software architecture 500 is nearly half the size of the amount of memory used by the known software architecture 404 described in FIG. 4 because the server application 214 is instantiated only once and the two instances of the client application 212 are relatively thin (i.e., have a relatively small memory footprint).

Additionally, the memory space saved is even more apparent when additional instances of the client application 212 are instantiated beyond the first and second instances because these may also share the same server application 214. Thus, three example instances of the client application 212 may all share a single server application 214, meaning that the total memory footprint is nearly a third the memory footprint of three full instances of the secondary application 210 implemented according to the known software architecture 404 described in FIG. 4. Accordingly, the example software architecture 500 described herein may advantageously reduce the memory footprint of multiple instances of the secondary applications 210, thereby freeing up memory for other applications, increasing the efficiency of the system, and/or reducing costs by lowering total memory requirements to run the desired applications.

As described above, each instance of the client application 212 interacts with the primary application 206 by establishing an interface between the primary and client applications 206 and 212 based on any appropriate application interfacing framework. Inasmuch as the application interfacing components 414 of the first and second instances of the client application 212 of FIG. 5 are the same as the application interfacing components 414 of the first and second instances of the secondary application 210 of FIG. 4, the interface between the primary and client applications 206 and 212 is the same as the interface between the primary and secondary applications 206 and 210 described above in connection with FIG. 4. Accordingly, from the perspective of the primary application 206, there is no functional difference between the known architecture 404 described in FIGS. 4A and 4B and the example software architecture 500 shown in FIG. 5. As a result, software developers of the primary application 206 may implement the example software architecture 500 without altering their software products so long as the primary application 206 already conforms to the application interfacing framework standards to establish a relationship between the primary application 206 and the client application 212. Furthermore, the primary application 206 may still interact with unitary secondary applications 210 (as described in FIG. 4) corresponding to devices that do not implement the example software architecture 500 described herein.

In addition to the interfacing of the first and second instance of the client application 212 with the primary application 206, the first and second instance of the client application 212 also interface with the server application 214. In some examples, the client and server applications 212 and 214 communicate and/or interact the same way that the primary and client applications 206 and 212 communicate and/or interact as described above. That is, the server application 214 may also contain standardized code similar to the application interfacing components 414 of the instances of the client application 212 that conforms to the application interfacing framework the applications are implementing to enable each application to recognize, instantiate, and/or interact with the components of the other. As a result, the primary application 206 and the server application 214 can communicate and/or interact indirectly via one of the instances of the client application 212 because the client application 212 interfaces with both the primary application 206 and the server application 214. In some examples, the client application 212 may provide little more than pass-through functionality between the primary application 206 and the server application 212. For example, when the primary application 206 provides the pointer to one of the instances of the client application 212, the instance of the client application 212 may share the pointer with the server application 214. Thus, as the server application 214 calculates data or otherwise determines content to be rendered within the primary user interface 208, the content is passed from the server application 214 via the pointer shared by the client application 212 directly to the frame 408 of the primary user interface 402. Similarly, when data, graphics, and/or other tasks are requested via the primary user interface 206 regarding a specific device, the corresponding client application 212 may share the requests with the server application 214 that contains the functional and/or user interface components to provide and/or execute the requested data, graphics, and/or other tasks.

While the foregoing discussion of the example software architecture 500 may be implemented according to FDT standards, the interface between the primary and client applications 206 and 212 as well as the interface between the client and server applications 212 and 214 may be based on any other suitable interfacing framework that standardizes how components of software applications interact. In particular, the interaction of the software applications enabled by the interfacing framework may include determining the presence and/or availability of objects/components of another software application, determining the capabilities of the objects/components of the other software application, instantiating the objects/components of the other software application, establishing communications with other objects/components of the other software application (intercommunications) and/or establishing communications with other objects/components of the same software application (intracommunications), etc.

Figure 6A:
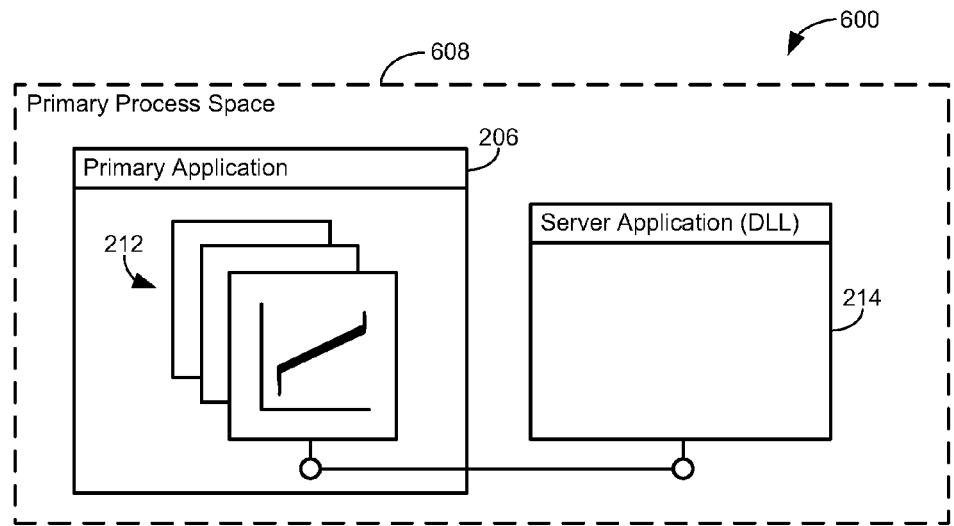
FIG. 6A illustrates an example single-user/single-process process space architecture to implement the software architecture of FIG. 5.
Figure 6B:
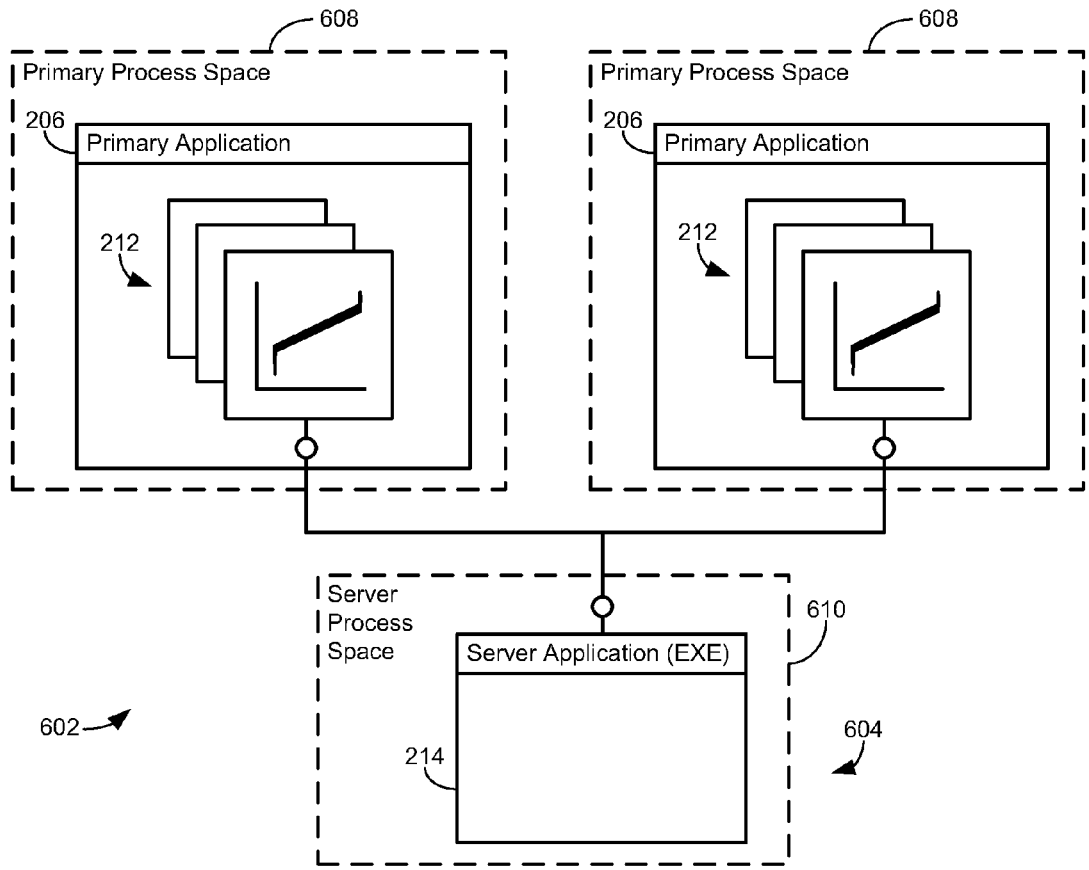
FIG. 6B illustrates an example multi-user/multi-process process space architecture to implement the software architecture of FIG. 5 with an example out-of-process server architecture.
Figure 6C:
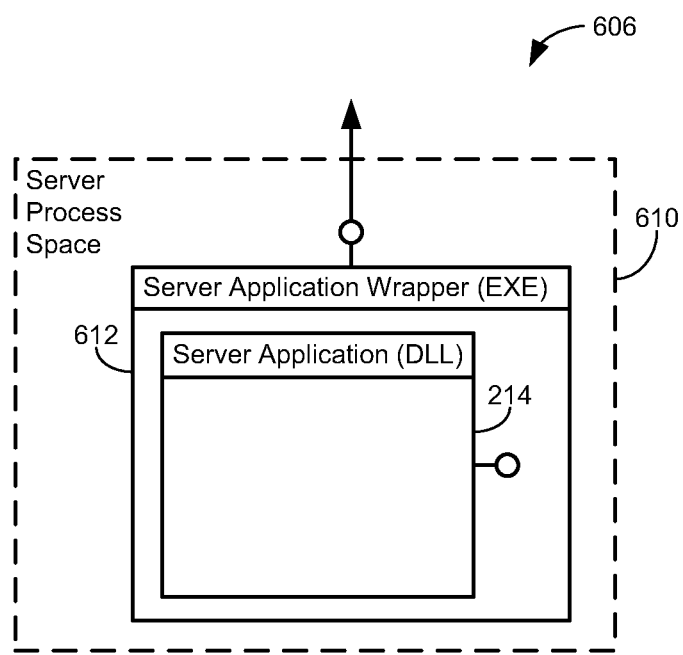
FIG. 6C illustrates an alternative example out-of-process server architecture that may be implemented within the process space architecture of FIG. 6B.

FIGS. 6A-6C illustrate example process space architectures 600 and 602 to implement the software architecture 500 of FIG. 5. In particular, FIG. 6A illustrates an example single-user/single-process architecture 600, FIG. 6B illustrates an example multi-user/multi-process architecture 602 with an example out-of-process server architecture 604, and FIG. 6C illustrates an alternative example out-of-process server architecture 606 that may be implemented within the process space architecture 602 of FIG. 6B.

Turning in detail to FIG. 6A, therein is illustrated a single primary process space 608 to execute an instance of the primary application 206 of FIG. 2. In the illustrated example, the primary application 206 has invoked multiple instances of the client application 212 in accordance with the example software architecture 500 of FIG. 5. Furthermore, the primary process space 600 of FIG. 6A also contains the server application 214 to serve the multiple instances of the client application 212. While three instances of the client application 212 are shown in the illustrated example, any suitable number of instances of the client application 212 may be invoked via the primary application 206.

FIG. 6B illustrates the example multi-user/multi-process architecture 602 having two separate primary process spaces 608, each executing an instance of the primary application 206. As shown, the multi-user/multi-process architecture 602 also contains the example out-of-process server architecture 604, wherein the server application 214 is executed in a server process space 610 that is separate from the primary process spaces 608. While only two instances of the primary application 206 are shown, any suitable number of primary applications 206 may be implemented by the multi-client/multi-process architecture 602 described herein. Similarly, while only one out-of-process server architecture 604 is shown, any suitable number of server process spaces 610 containing separate server applications 214 may be implemented.

The main distinction between FIGS. 6A and 6B is that the server application 214 in FIG. 6B may be an independent executable (EXE) file to be executed out-of-process in the server process space 612 while the server application 214 in FIG. 6A may be a dynamic link library (DLL) file to run in-process with the primary application 206. In other respects, the process space architectures 600 and 602 and the different applications function in the same manner. For example, regardless of the process space architecture (whether according to FIG. 6A or FIG. 6B), each of the one or more instances of the primary application 206, each of the one or more instances of the client application 212, and each of the one or more instances of the server application 214 establish interfacing relationships to communicate and/or interact in the same manner as described above in connection with FIGS. 4 and 5.

The different process space architectures 600 and 602 provide different advantages that may be used depending on the particular application and circumstance where the process space architectures 600 and 602 are to be implemented. For example, the example single-user/single-process architecture 600 of FIG. 6A is advantageously executed within a single process space to improve the communication performance between the primary and client applications 206 and 212 because they are in the same process space (i.e., the primary process space 608). However, if the server application 214 of the example architecture 600 of FIG. 6A malfunctions, the primary application 206 will also malfunction because they are in the same process space (i.e., the primary process space 608). In contrast, the example multi-user/multi-process architecture 602 of FIG. 6B alleviates this problem by placing the server application 214 in its own process space. Accordingly, if the server application 214 malfunctions when implemented in the multi-user/multi-process architecture 602, it will not disrupt the primary applications 206 because they are running in separate process spaces (i.e., the primary process spaces 608). Furthermore, an advantage of the multi-client/multi-process architecture 602 is that the server application 214 can serve multiple users (e.g., separate operator stations 104 described in FIGS. 1 and/or 2).

FIG. 6C illustrates an alternative example out-of-process server architecture 606 that may be implemented within the multi-client/multi-process architecture 602 of FIG. 6B. As illustrated, the server application 214 may be a DLL file placed within an executable wrapper (e.g., the server application wrapper 612). In this manner, the server application 214, as a DLL file, runs in-process with the server application wrapper 612, while the server application wrapper 612 (an EXE file) runs out-of-process with respect to the primary process spaces 608 shown in FIG. 6C in the separate server process space 610. Thus, both the single-user/single-process architecture 600 of FIG. 6A and the multi-client/multi-process architecture 602 of FIG. 6B may be implemented with a server application 214 having the same file format (i.e., a DLL) by placing the server application 214 within the server application wrapper 612 for the multi-client/multi-process architecture 602.

Figure 7:
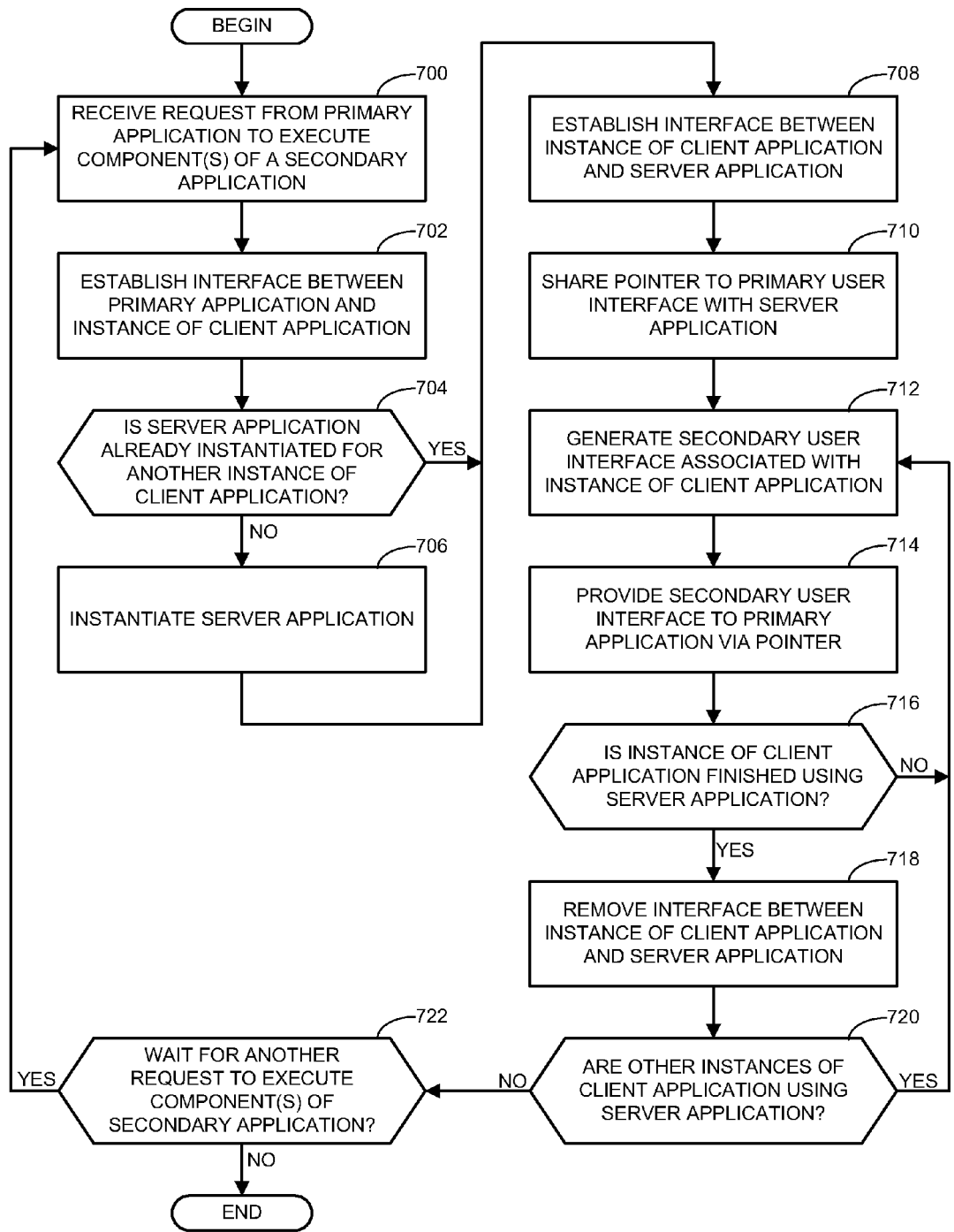
FIG. 7 is a flowchart representative of an example process that may be carried out to implement the example software architecture of FIG. 5, the example process space architectures of FIGS. 6A-6C, and/or, more generally, the example operator station of FIGS. 1 and/or 2.

FIG. 7 is a flowchart representative of an example process that may be carried out to implement the example software architecture 500 of FIG. 5, the example process space architectures 600 and 602 of FIGS. 6A-6C, and/or, more generally, the example operator station of FIGS. 1 and/or 2. More particularly, the example process of FIG. 7 may be representative of machine readable instructions that comprise a program for execution by a processor such as the processor 812 shown in the example computer 800 discussed below in connection with FIG. 8. The program may be embodied in software stored on a tangible computer readable medium such as a CD-ROM, a floppy disk, a hard drive, a digital versatile disk (DVD), a BluRay disk, or a memory associated with the processor 812. Alternatively, some or all of the example process of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example operations of FIG. 7 may be implemented manually or as any combination(s) of any of the foregoing techniques, for example, any combination of firmware, software, discrete logic and/or hardware. Further, although the example process is described with reference to the flowchart illustrated in FIG. 7, many other methods of implementing the example software architecture 500 of FIG. 5, the example process space architectures 600 and 602 of FIGS. 6A-6C, and/or the example operator station 104 of FIGS. 1 and/or 2 may alternatively be used. For example, the order of execution of the blocks may be changed, and/or some of the blocks described may be changed, eliminated, or combined. Additionally, any or all of the example process of FIG. 7 may be performed sequentially and/or in parallel by, for example, separate processing threads, processors, devices, discrete logic, circuits, etc.

As mentioned above, the example process of FIG. 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example process of FIG. 7 begins at block 700 where the secondary application 210 (FIG. 2) receives request(s) from the primary application 206 (FIG. 2) to execute component(s) of the secondary application 210. As shown in the illustrated example of FIG. 2, the secondary application 210 includes a client application portion 212 and a server application portion 214. Furthermore, the core functional components 410 (FIG. 5) and/or the core user interface components 412 (FIG. 5) of the secondary application 210 may be within the server application 214 while the application interfacing components 414 (FIG. 5) may be within the instance of the client application 212 to interact with the primary application 206. Accordingly, at block 702, an interface between the primary application 206 and instance(s) of the client application 212 is established. In particular, an instance of the client application 212 is instantiated in the memory 202 (FIG. 2) when invoked by the primary application 206. The instance of the client application 212 and the primary application 206 establish a relationship via the application interfacing components 414 within the client application 212 and corresponding application interfacing components in the primary application 206. Among other things, the primary application 206 may provide the client application 212 with a pointer to the frame 408 (FIG. 5) within the primary user interface 402 where a corresponding secondary user interface (e.g., the secondary user interfaces 406a-b of FIG. 5) of the secondary application 210 may be rendered.

To execute the component(s) requested by the primary application 206, the instance of the client application 212 may seek to establish a connection with the server application 214 because the server application 214 contains the requested component(s). To do so, the process of FIG. 7 determines whether the server application 214 has already been instantiated for another instance of the client application 212 (block 704). If the server application 214 has not been invoked by any other instance of the client application 212, the server application is instantiated (block 706). Once the server application 214 is instantiated, the client application 212 establishes an interface with the server application 214 (block 708). However, if during the example process of FIG. 7 it is determined that the server application 214 has already been instantiated (block 704), control advances directly to block 708 where the instance of the client application 212 establishes an interface with the already instantiated server application 214. The interface between the instance of the client application 212 and the server application 214 is similar to the interface between the client application 212 and primary application 206. That is, the client application 212 connects with the server application 214 via the application interfacing components 414 of the client application 212 and corresponding interfacing components within the server application 214. The server application 214 may then serve the instance of the client application along with any other instances of the client application 212 that have already established an interface with the server application 214.

At block 710, the instance of the client application 212 may share the pointer, received from the primary application, with the server application. In this manner, the content of the secondary user interface (e.g., the secondary user interfaces 406a-b of FIG. 5) corresponding to the instance of the client application 212 may be sent directly to the frame 408 of the primary user interface 210. The example process of FIG. 7 then advances to block 712 where the server application 214 generates the secondary user interface associated with the instance of the client application 212 the server application 214 is serving. The server application 214 may determine the data to generate the secondary user interface by executing any or all of the functional components 410 contained within the server application 214 and/or any or all of the user interface components 412 contained within the server application 214. The server application 214 may also determine the content of the secondary user interface based on additional user inputs made via the primary user interface 206. The server application 214 sends the generated secondary user interface associated with the instance of the client application 212 to the primary application 206 via the pointer shared by the instance of the client application (block 714). Once the secondary user interface is provided to the primary application 206, the primary application 206 may render the secondary user interface within the frame 408 of the primary user interface 208.

The example process of FIG. 7 then determines whether the instance of the client application 212 is finished using the server application 212 (block 716). If the instance of the client application 212 is still using the server application 214, control returns to blocks 712 and 714 where the server application 214 continues to generate the secondary user interface for the instance of the client application 212. If, however, the instance of the client application 212 is finished using the server application 214, the interface between the client application 212 and the server application 214 is dropped (block 718). The example process of FIG. 7 then determines whether other instances of the client application 212 are still interfacing with the server application 214 (block 720). If so, control returns to blocks 712 and 714 for the server application 214 to continuing serving the other instance(s) of the client application 212. If no other instances of the client application 212 are using the server application, control advances to block 722 where the example process determines whether to wait for new requests from the primary application 206 to execute the component(s) of the secondary application 210. If so, control returns to block 700 where the example process of FIG. 7 may be repeated. If the process of FIG. 7 determines to not wait for additional requests from the primary application 206, then the process ends.

Figure 8:
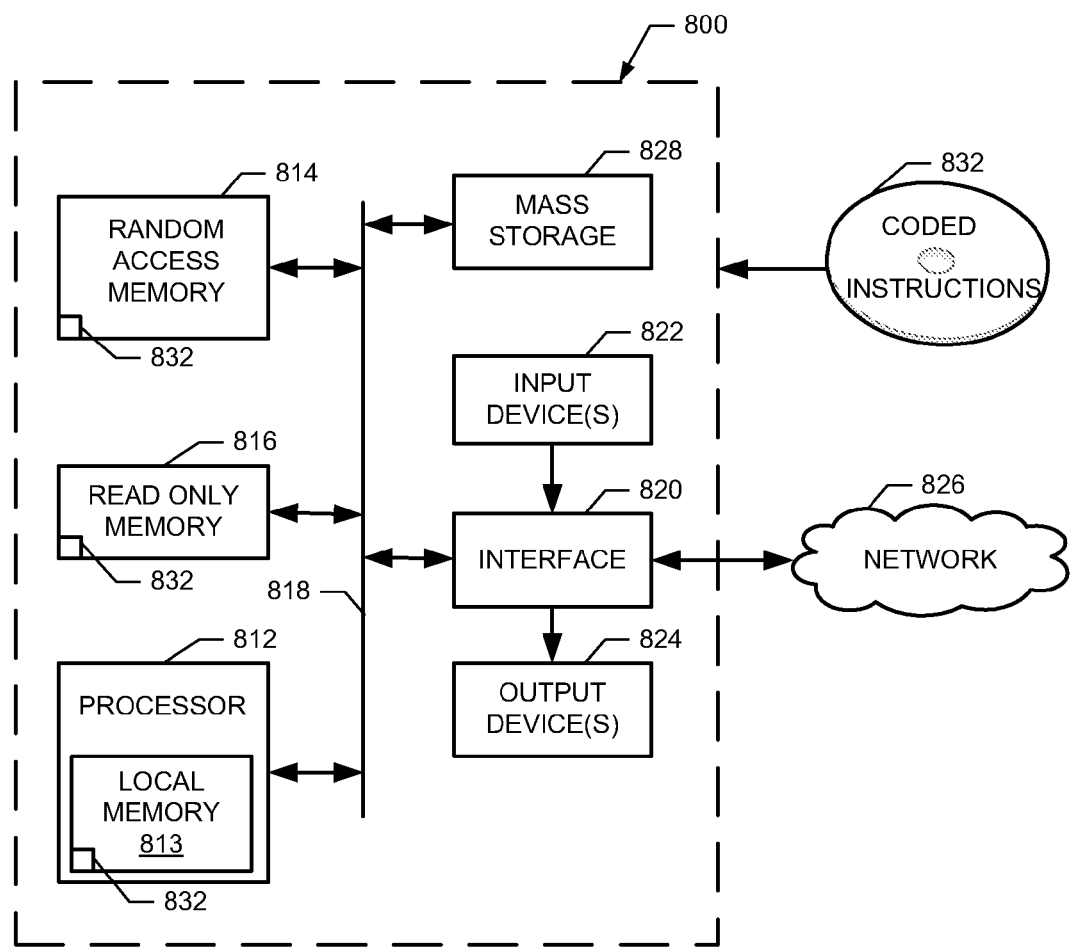
FIG. 8 is a schematic illustration of an example computer 800 that may be used and/or programmed to carry out the example process of FIG. 7.

FIG. 8 is a schematic illustration of an example computer 800 that may be used and/or programmed to carry out the example process of FIG. 7 and/or, more generally, to implement the software architecture 500 of FIG. 5, the example process space architectures 600 and 602 of FIGS. 6A-6C, and/or the example operator station 104 of FIGS. 1 and/or 2. The system 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814 and 816 is controlled by a memory controller.

The computer 800 also includes an interface circuit 820. The interface circuit 820 may be implemented by any type of interface standard, such as an Ethernet interface, a universal serial bus (USB), and/or a PCI express interface. One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system. One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives.

Coded instructions 832 to implement the example process of FIG. 7 may be stored in the mass storage device 828, in the volatile memory 814, in the non-volatile memory 816, and/or on a removable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. An apparatus, comprising:
a computing device including a processor and a memory, the processor to execute instructions stored in the memory to cause the computing device to at least:
receive a request via a primary user interface associated with a primary application associated with a process control system to execute at least one component of a secondary application associated with a first device in the process control system, wherein the secondary application includes a client application and a server application;
instantiate a first instance of the client application for the first device;
instantiate a second instance of the client application for a second device in the process control system, the first and second devices corresponding to a same type of device;
instantiate a single instance of the server application to serve both the first and second instances of the client application by providing information to each of the first and second instances of the client application generated from implementing the at least one component for each of the first and second devices, the first and second instances of the client application enabling pass-through of the information from the server application to the primary application, the at least one component providing functionality corresponding to the type of device of the first and second devices;
generate a secondary user interface associated with the first instance of the client application based on the information generated by the at least one component implemented by the server application; and
communicate the secondary user interface to the primary application for rendering in the primary user interface.

2. The apparatus as described in claim 1, wherein the primary application is to provide the client application with a pointer to a portion of the primary user interface.

3. The apparatus as described in claim 1, wherein the primary application is a process management software application.

4. The apparatus as described in claim 1, wherein the functionality of the at least one component corresponds to at least one of maintenance, calibration, reliability testing, configuration, diagnostics, communications, data collection and storage, e-mail, or printing associated with the type of device corresponding to the first and second devices in the process control system.

5. The apparatus as described in claim 1, wherein the client application enables a user of the primary application to interact with the at least one component implemented by the server application.

6. The apparatus as described in claim 1, wherein the server application is to be run at least one of in-process or out-of-process relative to the primary application.

7. The apparatus as described in claim 1, wherein interaction between the primary application, the client application, and the server application is enabled by application interfacing components in the primary application, the client application, and the server application.

8. The apparatus as described in claim 7, wherein the application interfacing components are based on field device tool standards.

9. A method, comprising:
   receiving a request via a primary user interface associated with a primary application associated with a process control system to execute at least one component of a secondary application associated with a first device in the process control system, wherein the secondary application includes a client application portion and a server application portion;
   instantiating the server application portion to serve the client application portion with information generated from implementing the at least one component;
   instantiating a first instance of the client application portion for the first device;
   instantiating a second instance of the client application portion for a second device in the process control system, the first and second devices corresponding to a same type of device;
   instantiating a single instance of the server application portion to serve both the first and second instances of the client application by providing information to each of the first and second instances of the client application generated from implementing the at least one component for each of the first and second devices, the first and second instances of the client application enabling pass-through of the information from the server application portion to the primary application, the at least one component providing functionality corresponding to the type of device of the first and second devices;
   generating a secondary user interface associated with the first instance of the client application portion based on the information generated by the at least one component implemented by the server application portion; and
   communicating the secondary user interface to the primary application for rendering in the primary user interface.

10. The method as described in claim 9, further comprising sharing a pointer with the server application portion, the pointer being provided by the primary application to the client application portion, to enable the server application portion to communicate the secondary user interface to the primary application.

11. The method as described in claim 9, further comprising running the server application portion at least one of in-process or out-of-process relative to the primary application.

12. The method as described in claim 9, wherein the at least one component implemented by the server application portion performs at least one of user interface generation, maintenance, calibration, reliability testing, configuration, diagnostics, communications, data collection and storage, e-mail, or printing associated with the type of device corresponding to the first and second devices in the process control system.

13. The method as described in claim 9, further comprising
   generating a second secondary user interface associated with the second instance of the client application portion based on the at least one component implemented by the server application portion for the second device; and
   communicating the second secondary user interface to the primary application for rendering in the primary user interface.

14. A tangible computer readable medium storing machine readable instructions which, when executed, cause a machine to at least:
   receive a request via a primary user interface associated with a primary application associated with a process control system to execute at least one component of a secondary application associated with a first device in the process control system, wherein the secondary application includes a client application and a server application;
   instantiate a first instance of the client application for the first device;
   instantiate a second instance of the client application for a second device in the process control system, the first and second devices corresponding to a same type of device having a same Device Type Manager;
   instantiate a single instance of the server application to serve both the first and second instances of the client application by providing information to each of the first and second instances of the client application generated from implementing the at least one component for each of the first and second devices, the first and second instances of the client application enabling pass-through of the information from the server application to the primary application, the at least one component providing functionality corresponding to the type of device of the first and second devices;
   generate a secondary user interface associated with the first instance of the client application based on the information generated by the at least one component implemented by the server application; and
   communicate the secondary user interface to the primary application for rendering in the primary user interface.

15. The tangible computer readable medium as described in claim 14, wherein the machine readable instructions, when executed, further cause the machine to share a pointer with the server application, the pointer being provided by the primary application to the client application, to enable the server application to communicate the secondary user interface to the primary application.

16. The tangible computer readable medium as described in claim 14, wherein the machine readable instructions, when executed, further cause the machine to run the server application at least one of in-process or out-of-process relative to the primary application.

17. The tangible computer readable medium described in claim 14, wherein the at least one component implemented by the server application performs at least one of user interface generation, maintenance, calibration, reliability testing, configuration, diagnostics, communications, data collection and storage, e-mail, or printing associated with the type of device corresponding to the first and second devices in the process control system.

18. The tangible computer readable medium as described in claim 14, wherein the machine readable instructions, when executed, further cause the machine to:
   generate a second secondary user interface associated with the second instance of the client application based on the at least one component implemented by the server application; and
   communicate the second secondary user interface to the primary application for rendering in the primary user interface.

* * * * *

UNITED STATES PATENT AND TRADEMARK OFFICE
CERTIFICATE OF CORRECTION

PATENT NO. : 9,002,929 B2
APPLICATION NO. : 13/410607
DATED : April 7, 2015
INVENTOR(S) : David Curtis Ingram Page 1 of 1

It is certified that error appears in the above-identified patent and that said Letters Patent is hereby corrected as shown below:

In the Claims

In Column 19, lines 12-14 (Claim 9), delete "instantiating the server application portion to serve the client application portion with information generated from implementing the at least one component".

Signed and Sealed this
Twenty-eighth Day of July, 2015

Michelle K. Lee
*Director of the United States Patent and Trademark Office*